(12) United States Patent
Friedrich

(10) Patent No.: US 7,768,948 B2
(45) Date of Patent: Aug. 3, 2010

(54) METHOD AND DEVICE FOR DATA TRANSMISSION

(75) Inventor: Ulrich Friedrich, Elhofen (DE)

(73) Assignee: Atmel Automotive GmbH, Heilbronn (DE)

( * ) Notice: Subject to any disclaimer, the term of this patent is extended or adjusted under 35 U.S.C. 154(b) by 1244 days.

(21) Appl. No.: 11/281,542

(22) Filed: Nov. 18, 2005

(65) Prior Publication Data

US 2006/0153123 A1 Jul. 13, 2006

(30) Foreign Application Priority Data

Nov. 19, 2004 (DE) .................. 10 2004 055 953
Nov. 24, 2004 (DE) .................. 10 2004 056 797

(51) Int. Cl.
*H04B 7/00* (2006.01)
(52) U.S. Cl. .................. 370/310; 370/315; 370/316; 370/466
(58) Field of Classification Search .................. 370/389, 370/392, 465, 466
See application file for complete search history.

(56) References Cited

U.S. PATENT DOCUMENTS

| | | | |
|---|---|---|---|
| 5,602,744 A * | 2/1997 | Meek et al. .................. | 705/412 |
| 6,289,209 B1 | 9/2001 | Wood, Jr. | |
| 6,745,056 B2 * | 6/2004 | Wang et al. .................. | 455/574 |
| 7,286,497 B2 * | 10/2007 | Bernheim et al. ........ | 370/310.2 |
| 7,333,479 B2 * | 2/2008 | Jalkanen et al. ............. | 370/352 |
| 2002/0199027 A1 | 12/2002 | Huber | |
| 2003/0133435 A1 | 7/2003 | Friedrich | |

FOREIGN PATENT DOCUMENTS

| | | |
|---|---|---|
| EP | 1 060 454 | 9/1999 |
| EP | 1 417 631 A | 2/2003 |
| WO | WO-99/45495 A1 | 9/1999 |
| WO | WO-03/015333 A2 | 2/2003 |

OTHER PUBLICATIONS

EPCglobal Inc., "Specification for an RFID Air Interface," EPC® Radio Frequency Identity Protocols, Class-1 Generation-2 UHF RFID, Protocol for Communications at 860 MHz-960 MHz, version 1.1.0 Draft 1, Jul. 19, 2005, pp. 1 and 25.

* cited by examiner

*Primary Examiner*—Ajit Patel
(74) *Attorney, Agent, or Firm*—Muncy, Geissler, Olds & Lowe, PLLC

(57) ABSTRACT

A method for transmitting data between a base station and at least one remote unit is provided. Conventional approaches to communication based on a predefined uniform transmission protocol do not function especially in open RFID systems with at least one base station and tags of a different (and variable) type and number, in which different customers are provided with one and the same tag solution. Primarily if several customers each wish to use a customer-specific solution, this can no longer be represented by a single uniform code. The method of the present invention makes it possible to introduce new, protocol-extending instruction sequences (protocol extensions) and to recognize these reliably as such, whereby these are not in conflict with the existing protocol.

21 Claims, 2 Drawing Sheets

METHOD AND DEVICE FOR DATA TRANSMISSION

This nonprovisional application claims priority under 35 U.S.C. §119(a) on German Patent Application No. DE 102004055953.8, which was filed in Germany on Nov. 19, 2004, and on German Patent Application No. DE 102004056797.2-31, which was filed in Germany on Nov. 24, 2004, and which are both herein incorporated by reference.

BACKGROUND OF THE INVENTION

1. Field of the Invention

The present invention relates to a method for transmitting data between a base station and at least one remote unit, such as a transponder or remote sensor, with an electromagnetic wave, onto which information packets of different symbols are modulated, wherein the information packets have at least one header section and one data section, wherein the symbols are explicitly defined in the header section of at least one information packet, and wherein in a subsequent data section, data are encoded by means of the symbols and transmitted.

Moreover, the invention relates to a device for transmitting data by means of an electromagnetic wave, onto which information packets of different symbols can be modulated, with a base station and at least one remote unit, such as a transponder or remote sensor, wherein the information packets have at least one header section and one data section, wherein the symbols are explicitly defined in the header section of at least one information packet, and wherein in a subsequent data section, data can be encoded by means of the symbols and transmitted.

2. Description of the Background Art

In general, methods for transmitting data between a base station and a remote unit, for example, a transponder or a remote sensor—designated herein together as "tag"—are used in order to perform an identification within a so-called authentification process. The basis for bidirectional data transmission between the tag and base station thereby forms a data protocol or transmission protocol, which specifies the number of information symbols, among other things, for example, the significant values per data bit, and defines the identity of the individual symbols. A corresponding method—particularly related to an advantageous structure of the header section—is the subject of EP 1417631, which corresponds to U.S. Publication No. 2003133435, and which is herein incorporated by reference.

Within the scope of international collaboration in the field of radio frequency identification (RFID), in the past so-called "(minimal) air interfaces" in the form of data protocol interfaces between the tag and base station have been defined, cf. "Specification for an RFID Air Interface, EPCglobal, EPC™ Radio Frequency Identity Protocols, Class-1 Generation-2 UHF RFID, Protocol for Communications at 860 MHz-960 MHz, version 1.0.7" of Sep. 27, 2004, which is abbreviated as EPCglobal. In agreements of the type, it is not subsequently possible to readily extend a once specified protocol in a simple manner with additional commands or the like. Another complicating factor is that in many cases in protocols of the types, code sequences are reserved for later official extensions. Concept considerations for EPCglobal are mentioned here as an example: based on a basic protocol concept (Class 1), other protocol classes (Class 2 and Class 3) with additional functionalities, such as sensor applications or security-relevant applications, are to be developed. For extensions beyond this standard, however, on the basis of the mentioned protocol concept, either so-called customer commands or certain fixed preset code sequences are to be considered, cf. EPCglobal, p. 11.

Such approaches usually do not function in open RFID systems with at least one base station and tags of a different (and variable) type and number, in which different customers are provided with one and the same tag solution. In fact, in such cases, the employed transmission protocol can basically offer customer-specific codes; however, complications arise if a plurality of customers receive, in addition, tags from different manufacturers, because a certain customer-specific command can only address one customer in each case. Especially if several customers each wish to use a customer-specific solution, consequently this can no longer be represented by a single uniform code. For this reason, novel solution mechanisms are required for platform solutions, in which a command code is to be extended cost-effectively or a switch to a modified operating mode (multiprotocol capability), such as full-duplex operation, is to be made possible.

SUMMARY OF THE INVENTION

It is therefore an object of the present invention to, proceeding from an air interface, as is disclosed, for example, in the EPCglobal specification, the further development of a method so that protocol-extending command sequences (designated hereafter together with mode switchings simply as "protocol extensions") are reliably recognized as such and do not conflict with an existing protocol. A device suitable for carrying out the method of the invention according to an embodiment, moreover, has a high reuse rate of logic circuits present by default, which results in additional cost effectiveness of the solution of the invention.

The object is achieved by a method of the aforementioned type in that in order to change an employed transmission protocol, at least one header section is modified so that in a remote unit, which does not support the changed protocol, an error condition is triggered and this unit thereupon withdraws from communication with the base station. A device of the aforementioned type is made for achieving the object in such a way that the base station for the purpose of changing an employed transmission protocol is set up to modify at least one header section, by which in a remote unit not supporting the changed protocol, an error condition associated with withdrawal from communication with the base station can be triggered. Hence, the sought extension of the instruction set is possible in a simple manner in RFID systems associated with suitable protocol agreements, in that the aforementioned header section is changed by the base station, which recognize the tags—at least as an error in the case when the protocol change is not supported. In particular, the method of the invention can be employed to change the data transmission from the base station to the tag to a full-duplex mode, whereby the tag backscatters the decoded signal so that the base station can rapidly recognize possible errors. It is stipulated in the already mentioned EPCglobal specification that the link is operated only in the half-duplex mode; otherwise, customer-specific commands are necessary, which specifically are to be avoided according to the invention, as a result of which the logic effort can be correspondingly limited.

In conjunction with the protocol switch of the invention, it is moreover possible to interpret certain (standard) commands differently from their standard definition and hence to use them, so to speak, double. Hereby, however, all available memory units and decoding units continue to be used, because the appropriate command word remains unchanged.

This circumstances also contributes to the situation that a high reuse rate of the existing circuit logic is achieved.

It is shown in the EPCglobal specification with reference to FIG. 6.4 therein on page 25, which header section structures are used for initializing (FIG. 6.4 top) or for command transmission (FIG. 6.4 bottom) of or in bidirectional RF connections between base station and tag. They correspond to those in the aforementioned EP publication of the same applicant. After a so-called delimiter, a "blank space" of a predefined duration, the indicated header section structures each have a logic data-0 symbol, which may be used to check the header section for plausibility. Because the implementation of such a plausibility check is not stipulated as mandatory, however, on the one hand, within the scope of the present invention, this symbol can be used advantageously to effect a protocol change. Accordingly, the method of the invention in a detailed embodiment is distinguished in that the first symbol of the at least one header section is modified. Preferably, in this regard, the first logic symbol of the at least one header section is changed to its opposite logic symbol; i.e., according to the invention a data-1 forms from a data-0. On the other hand, because of the nonbinding nature of the plausibility check, the result is also that certain tags may not note a change in the appropriate symbol, because no test occurs in them. A detailed embodiment of the method of the invention, which avoids this possibility with certainty, is described in detail below.

Alternatively, it would also be possible to add after the header section an additional symbol, whose duration in time is much longer than that of the symbol previously used in the header section, so that a protocol detection unit, routinely present in the tag, interprets this as an error, if the tag does not support an appropriate protocol extension. Such a solution, however, has the basic disadvantage that in rapid arbitration routines valuable time is lost due to the transmission of the additional symbol.

A preferred embodiment of the method of the invention provides that the first symbol of the at least one header section is temporarily stored and linked with a subsequent calibration symbol, for example, is compared with respect to time length, to detect the modification of the first symbol. Accordingly, a device of the invention in an embodiment may have a temporary memory unit for a symbol, modified compared with a first protocol, of the at least one header section, a linking unit for the temporarily stored symbol, and a calibration symbol, as well as a determining unit, which is designed to detect the modification of the temporarily stored symbol.

According to the EPCglobal Specification, following the data-0 symbol a calibration symbol RTcal is transmitted, whose length consists additively of the time duration of a data-0 and a data-1, whereby the half value of RTcal is used subsequently as a limiting value for differentiation between data-0 and data-1. In a preferred manner, therefore as taught by the invention, the first symbol of the header section is changed so that in conjunction with the following RTcal definition, for the modified first symbol a logic data-1 results, which is then recognized as such by the tag. To that end, the two named symbols are measured in regard to time according to the aforesaid and compared (linked), whereby the time length of the first symbol—as stated—was at least temporarily stored.

A tag, which supports the appropriate (based on the query manifested in the header section modification by the base station in regard to the following instruction data also necessary) protocol extensions, basically knows at this time that a command from the extended instruction set or a mode switching is to be executed or carried out. Nevertheless, it is necessary here that the tag also checks the length of the first symbol essentially as described. If this is not the case, the appropriate tag is not able to identify the changes in the protocol. For this reason, according to an embodiment, it is provided that during the modification of the at least one header section in a remote unit supporting the changed protocol, a pseudo-data stream of at least one signal pulse is generated, which can be used subsequently for clear differentiation of tags capable of extension from tags not capable of extension. Accordingly, the device of the invention is preferably designed in such a way that one of the remote units supporting the changed protocol during modification of the at least one header section is designed to create a pseudo-data stream of at least one signal pulse.

The pseudo-data stream within the scope of a further embodiment is active during the transmission of the header section by the base station. Present means "active"—that the pseudo-data stream is fed to a suitable unit of the device of the invention and that in so doing a defined change of the critical signal form, relative to the use of a default transmission protocol, occurs. For example, the pseudo-data stream can be fed to a testing unit, such as a CRC register, and there (co-) processed, so that it actively (co-)influences the result of the CRC determination.

The pseudo-data stream, e.g., a signal derived from notch signals routinely transmitted during the header section, is generated and provided during the at least one header section and/or directly after the receipt of a last header section symbol. For its processing, the device may have a circuit unit, which is designed to check a subsequent data section for its validity in accordance with the pseudo-data stream, i.e., that a subsequent data section is checked for its validity in accordance with the pseudo-data stream. The circuit unit for this purpose provides a result, which is used to check the validity of the command transmitted in the data section. The circuit unit, for example, may be a bit counter, which is started by the pseudo-data stream and simply counts the number of the transmitted bits, whereby every command sequence is formed by a specific preknown (and stored) number of bits to be transmitted and optionally test bits, such as parity bits or CRC bits. An appropriate detailed embodiment of the method of the invention provides that a number of data bits to be transmitted in the data section are checked. A command is accordingly regarded as valid, if the code is correct and accordingly the bit count corresponds to the preset definition of the command. If present, the checksum or the like must also be correct.

The aforementioned use of a bit counter can prove to be detrimental in view of cost, because the bit counter is also used for "noncritical" intermediate protocol steps, such as storing of a received command, as a result of which the decoding effort, necessary to detect the additional pulse of the pseudo-data stream, increases, which results in negative consequential costs.

An alternative possibility is to feed the pseudo-data stream produced by the tag to a circuit unit, which is available for the security level of the protocol, for example, a CRC or parity unit, so that a parameter allocated to the data section, such as a CRC or parity datum, is checked. Accordingly, in a device of the invention, the circuit unit is designed to check a parameter allocated to the data section. In this regard, it is achieved by a detailed embodiment of the process that, especially the checking of the parameter, triggers the error condition in the units not supporting the changed protocol.

In a remote unit supporting the changed protocol, an initial datum, a so-called preload value, necessary for checking the parameter, can be set as different from a standard value during modification of the at least one header section. This occurs particularly in that the initial datum necessary for checking the parameter is transmitted from the base station to the remote units, whereby the initial datum is transmitted preferably with the at least one header section. In so doing, the initial datum can be implicitly transmitted in an advantageous manner in that the pseudo-data stream, generated by the corresponding tags in response to the request by the base station, is used to set the initial value. "Implicit setting" in this case means that the base station does not simply set (predefine) a value for the CRC register, but the pseudo-data generated during the header section in the tag are used for this purpose. Alternatively, however, direct setting of the preload value without recourse to a pseudo-data stream is also possible.

A further embodiment provides that the parameter is generated by the base station with consideration of the pseudo-data stream generated in the unit supporting the changed protocol.

The tag thus at the end of the forward transmission can compare the result supplied by the circuit unit with a preknown expected value. In the case of a circuit unit especially made as a CRC unit, the base station and the tag hereby according to the aforesaid should take into account that to determine the CRC value, the start value of the calculation (initial datum) should be changed compared with a standard header section without a protocol extension because of the inserted pseudo-data stream. The start value is expressed as the so-called preload value—as already indicated above—and is preferably set implicitly in the header section for the tag: a reset of the CRC unit occurs after a first clock pulse generated by the tag as a function of symbols of the header section; the following pulses are given to the CRC register and used accordingly to set the preload value. Alternatively, it is possible in this regard to also perform the first reset of the CRC unit with a delimiting symbol (delimiter) introducing the header section. This approach has the advantage that a longer pseudo-data stream can be used.

The following procedure is therefore basically possible, by way of example, in the course of the present invention for the purpose of protocol extension: first, the first symbol of the at least one header section is modified by the base station. Preferably, for this purpose, the first logic symbol of the at least one header section is changed to its opposite logic symbol (data-1 instead of data-0). Next, it is possible to directly set in a simple manner a certain preload value (e.g., EEEEh), different from the standard (e.g., FFFFh for a 16-bit CRC register), which, however, is perhaps less favorable in terms of hardware technology than the subsequently indicated alternative. In view of the hardware effort to be exerted, it can be simpler to set (implicitly) the new preload value as described with utilization of the pseudo-data stream optionally generated by the tag.

After the header section, thus the instruction set is clearly defined in each case. If there is no protocol extension, a new resetting of the CRC unit occurs. Deviation from the CRC value determined by the base station and the tag causes an error message by the tag, which has recognized the CRC error (or accordingly a parity error) and thereupon withdraws from the communication.

If the (pseudo-)data sequence, expected for a certain (extended) instruction is defined beforehand, an optimized Hamming distance, which indicates how reliably the polynomial used in the CRC units is in regard to the reliability of a bit error detection, can be achieved via specific mathematical configuration of the employed unit. The pseudo-data stream can be published, e.g., in the data sheet of the tag or the corresponding IC. With three header section symbols each with a CRC clock pulse, thus 2^3 possible configurations for the pseudo-data stream result.

According to the invention, it is thereby possible to extend a preknown minimal definition for an RFID air interface so that totally new instruction sequences, e.g., a deterministic arbitration command or a "send subcarrier" instruction, or new operating modes, such as a full-duplex mode in the forward and return link, are freely switchable. As the first index for extensions of this type, the header section is changed first with consideration of favorable timing (only minor time prolongations). Next, the absolute differentiability is assured by at least one additional signal pulse, particularly by the processing of the pulse at the communication security level (CRC unit or bit counter), as described previously in detail.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
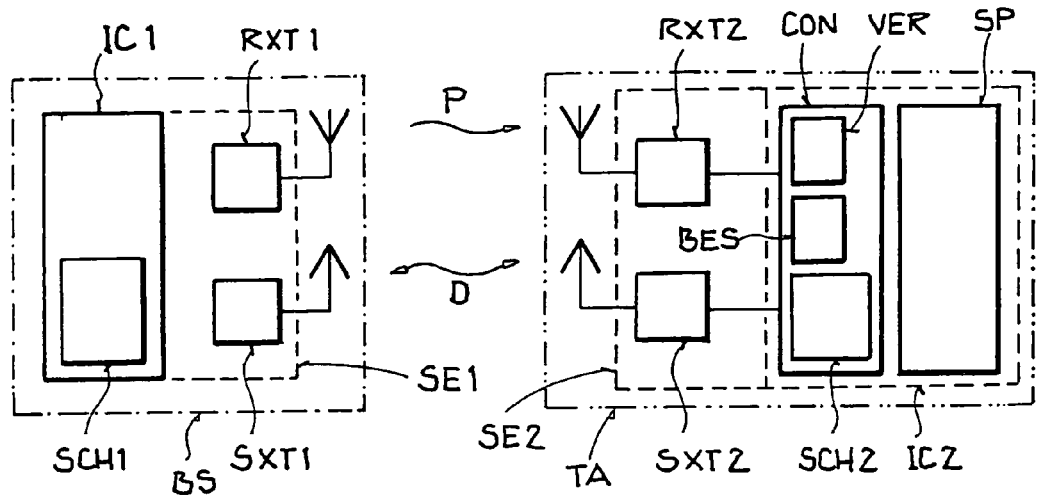
FIG. 1 illustrates a device according to an embodiment of the invention with a base station and a passive transponder.

FIG. 1 depicts a device according to an embodiment of the invention in the form of an arrangement for data transmission from a base station BS and a passive transponder (tag) TA. Hereby, the transponder TA takes its energy P from a carrier wave (not shown) of the base station BS. Systems of this type are used in, for example, the field of motor vehicles, among other fields, the transponder in this example being built into the door key and the base station BS into the automobile. The base station BS can also be integrated into or be a part of a radio telephony device, e.g., a cellular phone, and the transponder TA can also be integrated into other objects, such as, for example, a golf ball, a processor chip, a credit card, etc. The base station BS has an integrated circuit IC1, which controls a transmitting and receiving unit SE1 with a transmitting part SXT1 and a receiving part RXT1. For transmission of data D, the base station BS first transmits a modulated carrier wave (not shown), which is received by the transponder TA by a transmitting and receiving unit SE2, which has a receiving part RXT2 and a transmitting part SXT2, and is passed on to a control unit CON for evaluation, whereby the transmitting and receiving part SE2, in addition, absorbs the energy P necessary for supplying the transponder TA. The data transmission D occurs bidirectionally also back from the transponder TA to the base station BS (backscatter), for example, in a half- or full-duplex method.

The indicated receiving and transmitting parts each have a suitable antenna unit, such as a dipole antenna or the like. Furthermore, at least the integrated circuit IC2 comprises a control unit CON and a memory unit SP, in which, for example, the set parameters of a protocol used for data transmission of information packets and optionally certain protocol extensions according to the invention, such as instructions for mode switching, are stored. A corresponding memory unit (not shown) is also contained in an advantageous manner in the integrated circuit IC1 of the base station BS. Moreover, the memory unit SP can also be used for temporary storage of data received by the tag TA or individual received data bits. Both integrated circuits IC1, IC2, moreover, have a circuit unit SCH1, SCH2, which is designed to generate and check a parameter allocated to the transmitted data D, e.g., a CRC checksum. Consequently, the circuit unit can be particularly a CRC register, i.e., a type of calculator with a specific polynomial calculation specification, which can be acted upon with a suitable data stream, which is familiar to the person skilled in the art.

The integrated circuit IC2 or the control unit CON according to the invention furthermore has a linking unit VER for at least one data symbol temporarily stored in the memory unit SP (SYM1; see below for more detail) and for a calibration symbol received from the base station BS (RTcal; see below for more detail) and a determining unit BES, which is designed to detect a certain property of the temporarily stored symbol SYM1, such as a modification compared with a default transmission protocol. In the indicated exemplary embodiment, the linking unit VER is designed for comparing the two previously indicated symbols in regard to their time length so that the determining unit BES, optionally working together with the memory unit SP, in which the corresponding default values are stored, is capable of recognizing whether the length of the symbol SYM1 has changed in comparison with the standard line, e.g., has been lengthened.

According to the drawing in FIG. 1, the transmitting and receiving unit SE2 of the tag TA has a transmitting and receiving path. In conjunction with passive transponders, these are usually designed so that both paths—contrary to the shown exemplary embodiment—are operated with a mutual antenna, which is also known to the person skilled in the art.

Figure 2:
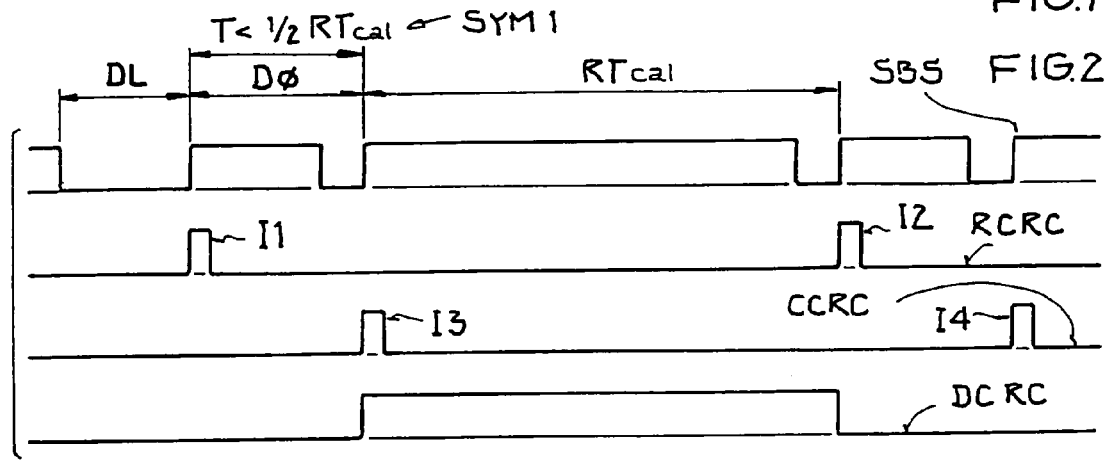
FIG. 2 is a timing diagram illustrating possible signal forms for the case of a default data stream without protocol extension.

FIG. 2 shows schematically possible time signal forms in the case of a default data stream, which is transmitted from the base station BS (FIG. 1) and in which there is no protocol extension. The time t in FIGS. 2 and 3 flows from left to right in the direction of the arrow. First, in FIG. 2 (top) a signal stream SBS from the base station BS to tag TA (FIG. 1) at a first data rate is shown. This is the beginning of a header section of, for example, two or three symbols, with which the base station and the tag each initiate a communication with the other device component (cf. the corresponding disclosure in EP 1417631 of the same applicant). Before the actual header section, there is a delimiting symbol, a so-called delimiter DL in the form of a field gap with a defined duration, cf. EPCglobal Specification. This is followed by a logic data-0 D0 as the first symbol SYM1 of the header section in the case of FIG. 2. This is defined as a symbol with a time duration $T<\frac{1}{2}\times RTcal$, where RTcal is a calibration symbol following the first symbol SYM1, which or whose time duration defines how the base station encodes the values 0, 1, and optionally an end of the transmission EOF (end of frame).

A signal form RCRC for a reset of the CRC register SCH2 of the tag TA (FIG. 1) is shown below the signal stream SBS in FIG. 2. Because the base station at the beginning of the header section sends a data-0 by default, the CRC register is reset twice into an initial state by the indicated pulses I1, I2, for example, after the RTcal symbol. As is shown thereunder, in this connection, at the end of each symbol of the header section, a pulse I3, I4 of a clock signal CCRC is generated and sent to the CRC register SCH2, whereby the active edge is the negative edge of the respective pulse I3, I4. The CRC register SCH2, in the case of a default data stream, accordingly in fact receives two pulses I3, I4, of which the second I4 is no longer in the header section but in the data section, following in time, of the transmission. Nevertheless, only this second clock pulse I4 has an impact, because a reset has occurred previously by the pulse I2: the pulse I2 takes the CRC-register SCH2 to the ground state; the next calculation step then follows with pulse I4.

A possible pseudo-data stream DCRC for the CRC calculation is shown below the CCRC signal. This data stream is a previously specified data sequence, which is preferably always generated in the same way. It ultimately has an effect only if no pulse I2 is present (see below; cf. FIG. 3). The data stream DCRC can basically also originate from the base station. In this case, however, the data resulting with the control symbols must be defined.

Alternatively, a realization is possible in this regard in which the CRC register is first set back to the initial state with the delimiter DL. Then, it is acted upon by a pseudo-data stream during the entire header section. The CRC register is reset by an appropriate pulse only when the tag has recognized that the protocol extension is not to be activated (cf. I2, I3 in FIG. 2).

Figure 3:
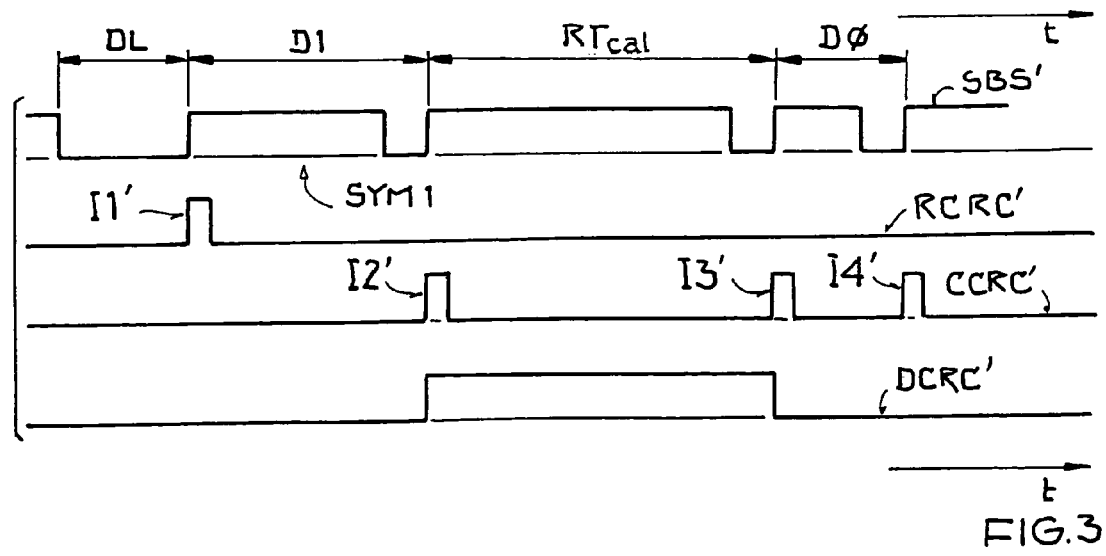
FIG. 3 is a timing diagram illustrating a case of a protocol extension with the use of a pseudo-data stream generated by a transponder.

FIG. 3, in contrast, shows the corresponding signal forms SBS', RCRC', CCRC', and DCRC' for the case that a tag TA supporting protocol extensions (FIG. 1) is requested by the base station BS to access the extended instruction set or to change to another operating mode. The drawing in FIG. 3 is based solely for graphic reasons on a second data rate, which is different from the data rate of FIG. 2. This has no limiting effect on the subject of the invention.

For the purpose of protocol extension, the base station BS after the delimiter DL as first symbol SYM1 of the signal stream SBS' sends a data-1 D1, followed by the calibration symbol RTcal, as described above. Based on the data-1 in the signal stream SBS', in this case after the RTcal symbol, no reset of the CRC register SCH2 occurs, but only by a pulse I1' of the signal RCRC' following the delimiter DL. Subsequently, all clock pulses I2'-I4' of the signal CCRC' go to the CRC register SCH2, so that a preload value, changed in comparison with the drawing in FIG. 2, arises for this, which is also to be considered in the subsequent calculation of the CRC checksum with involvement of the pseudo-data stream DCRC' generated by the tag. The pseudo-data stream DCRC' for the CRC calculation in turn is a previously specified data sequence, which preferably is always generated in the same way and has an effect when on hand, because no reset pulse I2 is present (see above; cf. FIG. 2).

As an alternative embodiment, instead of data-1 D1 (FIG. 3), the EOF symbol introduced above can also be used as the first symbol SYM1 for the data-0 D0 (FIG. 2) to indicate the protocol extension.

The preload value is implicitly reported subsequently to the tag TA by the base station BS in the header section and recognized by the tag, if the tag supports the protocol extension and evaluates the first symbol SYM1 of the header section. The base station knows in each case the correct CRC checksum with consideration of the preload value, or the value can be determined by the circuit unit SCH1 (FIG. 1) and is transmitted to the tag. According to the invention, this will determine no CRC error only when it has correctly taken the preload value from the header section, i.e., when it also actually supports the protocol extension. This circumstance is used within the scope of the present invention for withdrawing such tags, which detect a CRC error in the case of FIG. 3, from communication with the base station.

Figure 4:
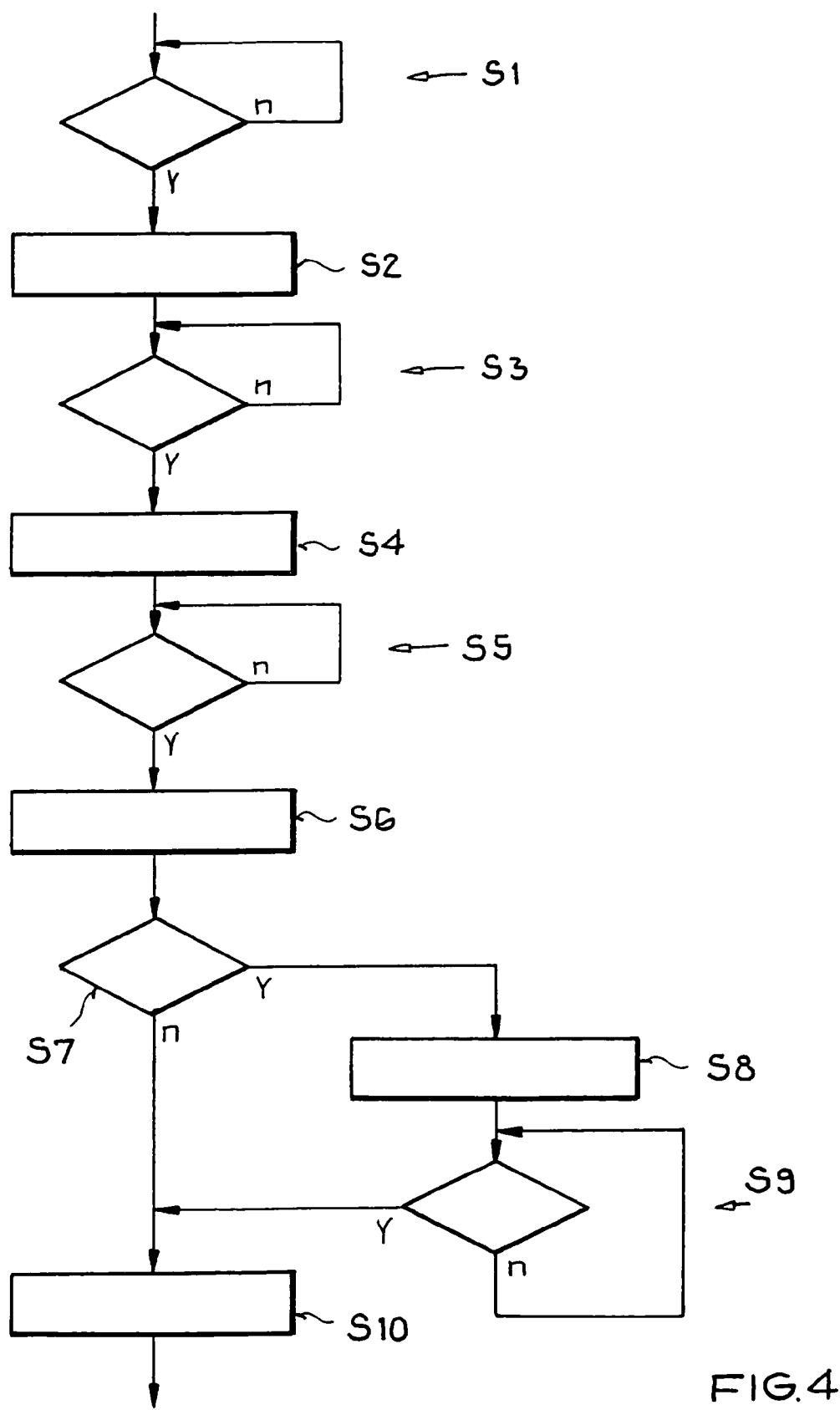
FIG. 4 is a flow chart of a transmission method of the invention.

Finally, using a flow diagram, FIG. 4 again shows a possible sequence of the method of the invention. First, the tag TA (FIG. 1) in a first step S1 waits for the delimiter DL (FIGS. 2 and 3). If the corresponding loop-like query in step S1 is affirmed (y) and has been received, the CRC register SCH2 is reset in step S2. Otherwise (n), step S1 is again executed.

After step S2, the tag in step S3 waits for the next rising edge in the signal stream SBS, SBS' (FIGS. 2 and 3), which marks the end of the first symbol SYM1, here: data-0 D0 (FIG. 2) or data-1 D1 (FIG. 3). If the corresponding loop-like query in step S3 is affirmed (y), in the following step S4 the time length T of the first symbol SYM1 (cf. FIGS. 2 and 3) is temporarily stored in the memory unit SP (FIG. 1) and the logic state of the DCRC(') data stream (FIGS. 2 and 3) is changed, DCRC(')=1. At the same time, a clock pulse I1, I1' is sent to the CRC register SCH2. The appropriate new value of the register here depends explicitly on the employed calculation specification (polynomial). Thereupon, the tag in step S5 again waits for a rising signal edge, whose arrival (y) defines the end of the RTcal symbol (FIGS. 2 and 3). Next, in step S6 the value for RTcal is stored in the memory unit SP, the logic state of the DCRC(') data stream (FIGS. 2 and 3) is changed, DCRC(')=0, and another clock pulse is sent to the CRC register SCH2.

Furthermore, the value of the first symbol SYM1 is checked in step S6. For this purpose, according to the invention, the temporarily stored symbol SYM1 is linked in the linking unit VER (FIG. 1) with the following calibration symbol RTcal with arithmetic comparison—as was already described in detail above—to detect the (time) modification of the first symbol by the determining unit BES (FIG. 1). This is followed in step S7 by a query to the effect whether the first symbol is a data-0 D0. If this query is affirmed (j [y]), the CRC register SCH2 is set back in step S8 until the arrival of the first data symbol, cf. pulse I2 in FIG. 2. After this, the tag in step S9 waits for the end of the header section, which is defined, e.g., as in EP 1417631. In this case (j [y]), the process branches after step S10, which for SYM1=D1 (first symbol is a data-1, FIG. 3) directly follows step S7, and sends additional clock pulses (I4 in FIG. 2; I3', I4' in FIG. 3) to the CRC register SCH2 until the end of the transmission is reached. If the first actual data are transmitted, the CRC register accordingly has different values for the two cases described above.

According to the invention, the process then proceeds as already described above in detail.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for transmitting data between a base station and at least one transponder with an electromagnetic wave, the method comprising the steps of:
modulating information packets of different symbols onto the electromagnetic wave, the information packets having at least one header section and one data section, the symbols being defined in the header section of at least one information packet, and
encoding data via the symbols in a subsequent data section; and
transmitting the data,
wherein, to change an employed transmission protocol, at least one header section is modified so that in any one of said at least one a transponder, which does not support the changed protocol, an error condition is triggered and said any one of said at least one transponder thereupon withdraws from communication with the base station, wherein any other one of said at least one transponder which does support the changed protocol remains in communication with the base station.

2. The method according to claim 1, wherein a first symbol of the at least one header section is modified.

3. The method according to claim 2, wherein a first logic symbol of the at least one header section is changed to its opposite logic symbol.

4. The method according to claim 3, wherein the first symbol of the at least one header section is temporarily stored and linked with a subsequent calibration symbol, to detect a modification of the first symbol.

5. The method according to claim 1, wherein, during a modification of the at least one header section in said any other one of said at least one transponder which does support the changed protocol, a pseudo-data stream of at least one signal pulse is generated.

6. The method according to claim 5, wherein the pseudo-data stream is generated during the at least one header section and/or directly after receipt of a last header section symbol.

7. The method according to claim 5, wherein, in accordance with the pseudo-data stream, a subsequent data section is checked for its validity.

8. The method according to claim 7, wherein a number of data bits to be transmitted in the data section are checked.

9. The method according to claim 8, wherein a parameter, a CRC, or parity datum that is allocated to the subsequent data section is checked.

10. The method according to claim 9, wherein the checking of the parameter triggers the error condition in the units not supporting the changed protocol.

11. The method according to claim 9, wherein, in said any other one of said at least one transponder which does support the changed protocol, an initial datum necessary for checking the parameter during modification of the at least one header section is set to be different than a standard value.

12. The method according to claim 11, wherein the initial datum necessary for checking the parameter is transmitted from the base station to the at least one transponder.

13. The method according to claim 12, wherein the initial datum is transmitted with the at least one header section.

14. The method according to claim 9, wherein the parameter is generated by the base station with consideration of the pseudo-data stream generated in the unit supporting the changed protocol.

15. A device for transmitting data by an electromagnetic wave, onto which information packets of different symbols can be modulated, the device comprising:
a base station; and
at least one transponder, the information packets having at least one header section and one data section, the symbols being defined in the header section of at least one information packet, and in a subsequent data section, data can be encoded by the symbols and transmitted,
wherein the base station for a purpose of changing an employed transmission protocol modifies at least one header section, by which in any one of said at least one transponder not supporting the changed protocol, an error condition associated with withdrawal from communication with the base station is triggered, and wherein any other one of said at least one transponder which does support the changed protocol remains in communication with the base station.

16. The device according to claim 15, wherein the at least one transponder includes a temporary memory unit for a symbol, which is modified compared with a first protocol, of the at least one header section, a linking unit for the temporarily stored symbol, a calibration symbol, and a determining unit that detects the modification of the temporarily stored symbol.

17. The device according to claim 15, wherein said any other one of said at least one transponder which does support the changed protocol a during the modification of the at least one header section generates a pseudo-data stream of at least one signal pulse.

18. The device according to claim 17, wherein a circuit unit checks a subsequent data section for its validity in accordance with the pseudo-data stream.

19. The device according to claim 18, wherein the circuit unit checks a number of data bits to be transmitted in the data section.

20. The device according to claim 18, wherein the circuit unit checks a parameter allocated to the data section, such as a CRC or parity datum.

21. The device according to claim 20, wherein the circuit unit is a CRC or parity unit.

* * * * *